(12) United States Patent
Iwasa et al.

(10) Patent No.: US 8,602,154 B2
(45) Date of Patent: Dec. 10, 2013

(54) ELECTRIC POWER STEERING DEVICE

(75) Inventors: Souichi Iwasa, Osaka (JP); Toshio Iida, Osaka (JP)

(73) Assignee: JTEKT Corporation, Osaka (JP)

( * ) Notice: Subject to any disclaimer, the term of this patent is extended or adjusted under 35 U.S.C. 154(b) by 477 days.

(21) Appl. No.: 10/587,316

(22) PCT Filed: Jan. 27, 2005

(86) PCT No.: PCT/JP2005/001554
§ 371 (c)(1),
(2), (4) Date: Jul. 26, 2006

(87) PCT Pub. No.: WO2005/073054
PCT Pub. Date: Aug. 11, 2005

(65) Prior Publication Data
US 2007/0158131 A1    Jul. 12, 2007

(30) Foreign Application Priority Data
Jan. 29, 2004  (JP) .................................. 2004-22118

(51) Int. Cl.
*B62D 5/04*        (2006.01)

(52) U.S. Cl.
USPC ............................................ 180/444; 464/73

(58) Field of Classification Search
USPC ......... 180/443, 444, 446; 464/73; 74/338 PS, 74/411
See application file for complete search history.

(56) References Cited

U.S. PATENT DOCUMENTS

| | | | | |
|---|---|---|---|---|
| 2,034,001 A | * | 3/1936 | Ricefield | 464/73 |
| 2,135,634 A | * | 11/1938 | Knights | 464/73 |
| 3,638,454 A | | 2/1972 | Croset | |
| 4,557,703 A | * | 12/1985 | Rivin | 464/73 |
| 6,393,929 B1 | * | 5/2002 | Quere et al. | 74/411 |
| 6,993,989 B2 | * | 2/2006 | Oomura et al. | 74/7 E |
| 7,228,933 B2 | * | 6/2007 | Joushita | 180/444 |
| 2001/0035310 A1 | * | 11/2001 | Tsuboi et al. | 180/444 |
| 2003/0176222 A1 | * | 9/2003 | Zimmermann et al. | 464/73 |
| 2006/0205293 A1 | * | 9/2006 | Fuse | 440/83 |
| 2008/0035414 A1 | * | 2/2008 | Kubota et al. | 180/444 |

FOREIGN PATENT DOCUMENTS

| | | |
|---|---|---|
| FR | 865265 | 5/1941 |
| JP | 2-150425 | 12/1990 |
| JP | 2001-301630 | 10/2001 |
| JP | 2002-145083 | 5/2002 |
| JP | 2002-242950 | 8/2002 |
| JP | 2003-13989 | 1/2003 |

* cited by examiner

*Primary Examiner* — Anne Marie M. Boehler
(74) *Attorney, Agent, or Firm* — Rabin & Berdo, PC

(57) ABSTRACT

An electric power steering device includes a power transmission joint (21) which coaxially couples an output shaft of a steering assist electric motor to an input shaft of a speed reduction mechanism for power transmission. The power transmission joint (21) includes first and second engagement members (41, 42) and an elastic member (43) disposed between the first and second engagement members (41, 42). The elastic member (43) includes an annular main body (44) and a plurality of engagement arms (45) provided at a predetermined interval circumferentially of the main body (44). The engagement arms (45) are engaged with engagement projections (55, 56) of the first and second engagement members (41, 42) circumferentially (X1) of the main body (44). Power transmission faces (46, 460) of the engagement arms (45) include power transmission faces (460) each having a relatively great interference (d1) and power transmission faces (46) each having a relatively small interference (d2).

20 Claims, 10 Drawing Sheets

ELECTRIC POWER STEERING DEVICE

TECHNICAL FIELD

The present invention relates to an electric power steering device which generates a steering assist force by an electric motor.

BACKGROUND ART

Automotive electric power steering devices (EPS) employ a speed reduction apparatus. A column-type electric power steering device, for example, is adapted to reduce the rotation speed of an output shaft of an electric motor through a worm shaft and a worm wheel to amplify the output of the electric motor and transmit the output to a steering mechanism, thereby providing torque assist for a steering operation.

In general, a cylindrical joint which connects the output shaft of the electric motor to the worm shaft provides spline-coupling to an end of the worm shaft. The spline-coupled portion has a slight play defined in a rotation direction, so that noise occurs due to rattling attributable to the play.

To cope with this, an electric power steering device is provided in which an output shaft of an electric motor is coupled to a worm shaft via a joint including an elastic member for power transmission (see, for example, Japanese Unexamined Patent Publication No. 2002-145083 disclosed by Japanese Patent Office on May 22, 2002).

The elastic member is disposed between a pair of co-rotatable iron engagement members at opposed ends of the output shaft and the worm shaft with an interference. If the interference is great, it is difficult to fix the elastic member between the engagement members, and a loss torque due to frictional resistance is increased to deteriorate a steering feeling.

On the other hand, if the interference is small, the elastic member is worn during prolonged use, so that gaps are formed between the elastic member and the engagement members. Therefore, the joint has plays defined in a rotation direction due to the gaps. As a result, noise and torque transmission variation occur to deteriorate the steering feeling.

Further, the respective components have different dimensional tolerances, making it very difficult to properly determine the interference.

It is an object of the present invention to provide an electric power steering device which is easier to assemble, has a relatively small loss torque, and suppresses rattling and noise for a long period of time.

DISCLOSURE OF THE INVENTION

To achieve the aforesaid object, an electric power steering device according to a preferred embodiment of the present invention comprises a steering assist electric motor having an output shaft, a speed reduction mechanism including an input shaft disposed coaxially with the output shaft of the electric motor, and a power transmission joint which couples the output shaft of the electric motor to the input shaft of the speed reduction mechanism for power transmission. The power transmission joint includes an annular first engagement member co-rotatably connected to the output shaft of the electric motor, an annular second engagement member co-rotatably connected to the input shaft of the speed reduction mechanism, and an elastic member disposed between the first and second engagement members for transmitting a torque between the first and second engagement members. The elastic member includes an annular main body, and a plurality of engagement arms provided at a predetermined interval circumferentially of the main body as extending radially from the main body. The first and second engagement members each include a plurality of engagement projections engaged with the respective engagement arms of the elastic member circumferentially of the main body. The engagement arms of the elastic member each include a pair of power transmission faces, which are engaged with power transmission faces of corresponding engagement projections of the first and second engagement members with interferences. The power transmission faces of the engagement arms include power transmission faces each having a relatively great interference and power transmission faces each having a relatively small interference.

According to this embodiment, the power transmission faces of the engagement arms include the relatively small interference power transmission faces, so that the elastic member can be easily fixed between the first and second engagement members. Further, the elastic member easily accommodates centering offset and angular offset between the first and second engagement members, and suppresses an increase in loss torque occurring due to the frictional resistance during the rotation, thereby improving the steering feeling.

In addition, even if the engagement arms of the elastic member are flattened during prolonged use, the relatively great interference power transmission faces still have sufficient interferences. Therefore, the torque transmission is mainly achieved through the power transmission faces still having the sufficient interferences. As a result, the noise and the torque transmission variation can be suppressed for a long period of time.

BEST MODE FOR IMPLEMENTING THE INVENTION

Figure 1:
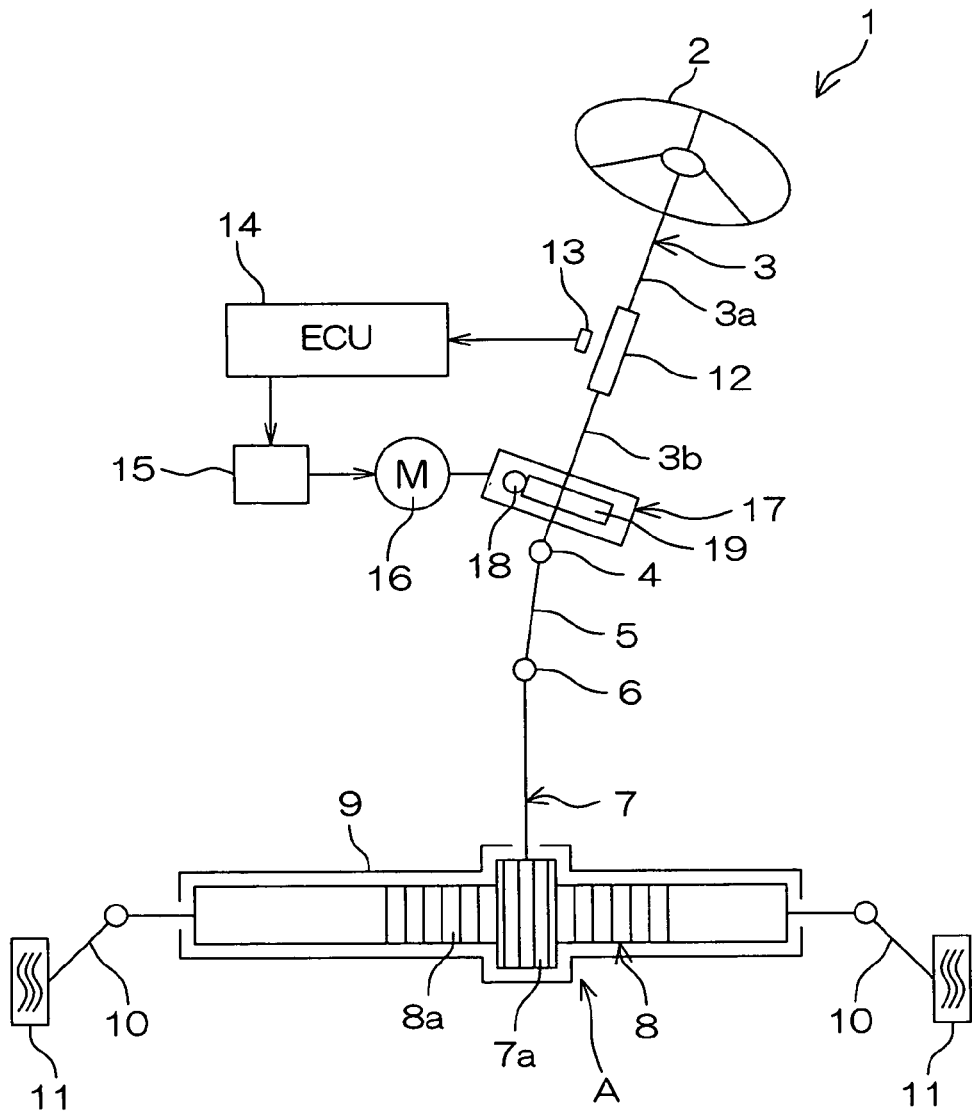
FIG. 1 is a schematic diagram illustrating the schematic construction of an electric power steering device according to one embodiment of the present invention.

Embodiments of the present invention will hereinafter be described with reference to the attached drawings. FIG. 1 is a schematic diagram illustrating the construction of an electric power steering device including a power transmission joint according to one embodiment of the present invention.

Referring to FIG. 1, the electric power steering device 1 includes a steering shaft 3 connected to a steering member 2 such as a steering wheel, an intermediate shaft 5 connected to the steering shaft 3 via a universal joint 4, a pinion shaft 7 connected to the intermediate shaft 5 via a universal joint 6, and a rack bar 8 which has a rack tooth 8a meshed with a pinion tooth 7a provided around an end portion of the pinion shaft 7 and serves as a turning shaft extending transversely of a motor vehicle. The pinion shaft 7 and the rack bar 8 constitute a rack and pinion mechanism A as a steering mechanism.

The rack bar 8 is supported in a linearly reciprocal manner in a housing 9 fixed to a body of the motor vehicle via a plurality of bearings not shown. Opposite ends of the rack bar 8 project laterally of the housing 9, and are respectively coupled to tie rods 10. The tie rods 10 are respectively coupled to corresponding steerable wheels 11 via corresponding knuckle arms (not shown).

When the steering member 2 is operated to rotate the steering shaft 3, the rotation is converted into the linear motion of the rack bar 8 transverse of the motor vehicle by the pinion tooth 7a and the rack tooth 8a. Thus, the turning of the steerable wheels 11 is achieved.

The steering shaft 3 is divided into an upper shaft 3a provided on an input side coupled to the steering member 2 and a lower shaft 3b provided on an output side coupled to the pinion shaft 7. The upper and lower shafts 3a, 3b are coaxially connected to each other via a torsion bar 12 in a relatively rotatable manner.

A torque sensor 13 is provided for detecting a steering torque on the basis of relative rotational offset between the upper and lower shafts 3a and 3b via the torsion bar 12. The result of the detection of the torque by the torque sensor 13 is applied to an electronic control unit (ECU) 14. The electronic control unit 14 controls the driving of a steering assist electric motor 16 via a driving circuit 15 on the basis of the torque detection result, a vehicle speed detection result applied from a vehicle speed sensor not shown and the like. The speed of the output rotation of the electric motor 16 is reduced and transmitted to the pinion shaft 7 by a speed reduction mechanism 17. Further, the rotation is converted into the linear motion of the rack bar 8 for steering assist. The speed reduction mechanism 17 includes a worm shaft 18 as an input shaft rotatively driven by the electric motor 16, and a worm wheel 19 meshed with the worm shaft 18 and co-rotatably coupled to the lower shaft 3b of the steering shaft 3.

Figure 2:
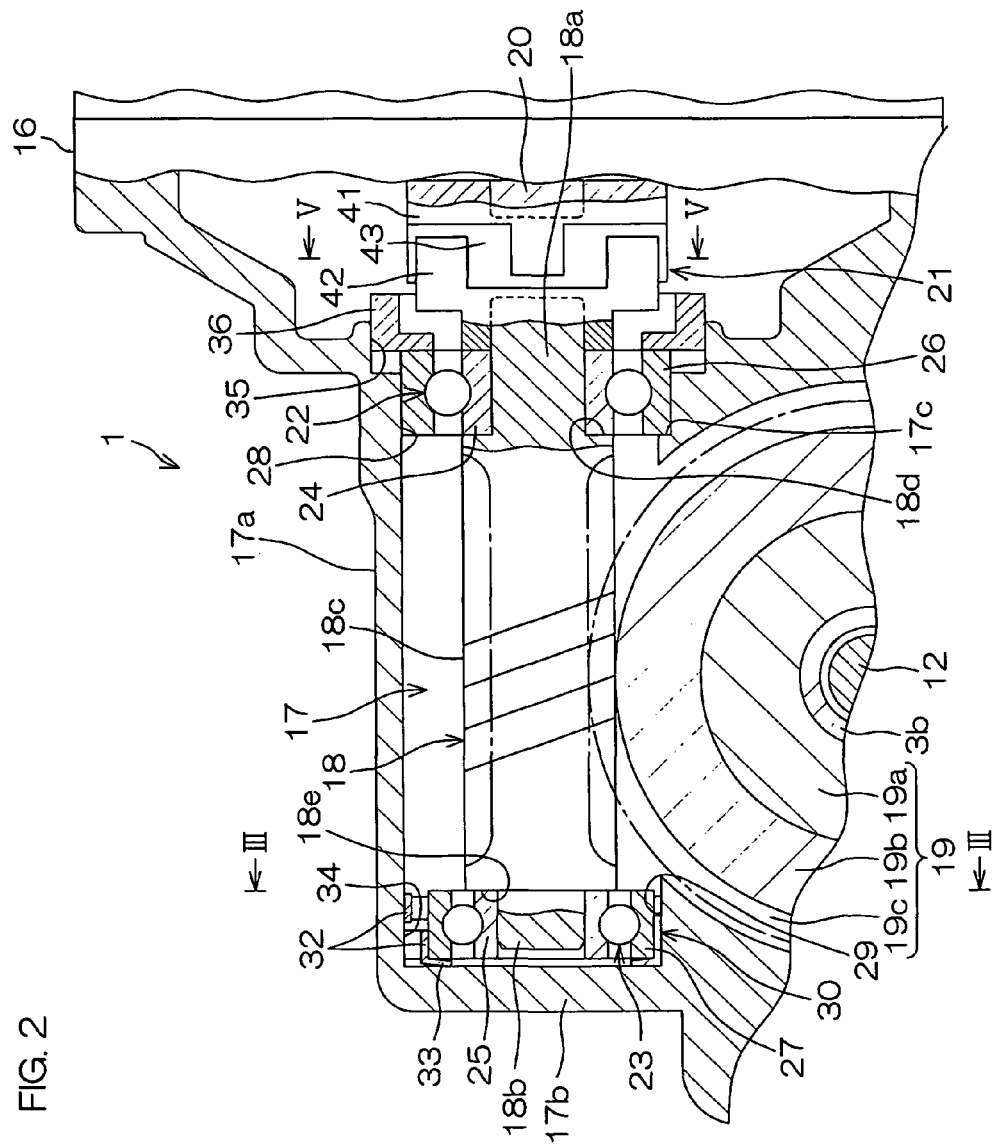
FIG. 2 is a sectional view of major portions of the electric power steering device.

Referring to FIG. 2, the worm shaft 18 is disposed coaxially with an output shaft 20 of the electric motor 16. The worm shaft 18 has first and second end portions 18a, 18b axially spaced from each other, and a tooth portion 18c provided between the first and second end portions 18a and 18b.

The worm wheel 19 is coupled to an axially middle portion of the lower shaft 3b of the steering shaft 3 in a co-rotatable manner with its axial movement prevented. The worm wheel 19 includes an annular metal core 19a co-rotatably coupled to the lower shaft 3b, and a synthetic resin member 19b fitted around the metal core 19a and having a tooth portion 19c provided circumferentially thereof. The worm wheel 19 is prepared, for example, by molding the synthetic resin member 19b from a resin with the metal core 19a inserted in a mold.

The first end portion 18a of the worm shaft 18 is coaxially connected for power transmission to an end of the output shaft 20 of the electric motor 16 opposed to the first end portion 18a via a power transmission point 21 which is a feature of this embodiment.

The first and second end portions 18a, 18b of the worm shaft 18 are rotatably supported in a housing 17a of the speed reduction mechanism 17 via corresponding first and second bearings 22, 23. The first and second bearings 22, 23 are, for example, ball bearings.

Inner rings 24 and 25 of the first and second bearings 22 and 23 are respectively engaged co-rotatably with the first and second end portions 18a and 18b of the worm shaft 18. The inner rings 24 and 25 respectively abut against positioning steps 18d and 18e of the worm shaft 18 facing away from each other. Outer rings 26 and 27 of the first and second bearings 22 and 23 are respectively retained in corresponding bearing retention holes 28 and 29 of the housing 17a of the speed reduction mechanism 17 in a non-rotatable manner.

The bearing retention hole 29 for the second bearing 23 is provided as a bias hole in which the second bearing 23 is held so as to be biased radially toward the worm wheel. An annular biasing member 30 is disposed between an inner peripheral surface of the bearing retention hole 29 and an outer peripheral surface of the outer ring 27 of the second bearing 23.

Figure 3:
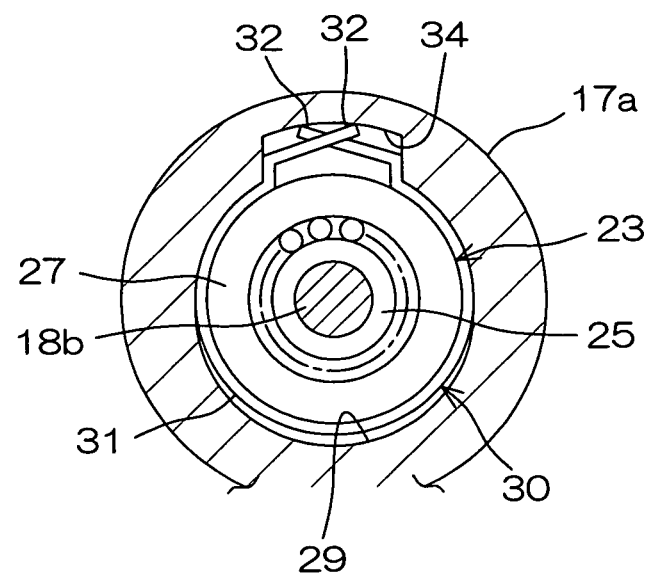
FIG. 3 is a sectional view taken along a line III-III in FIG. 2.
Figure 4:
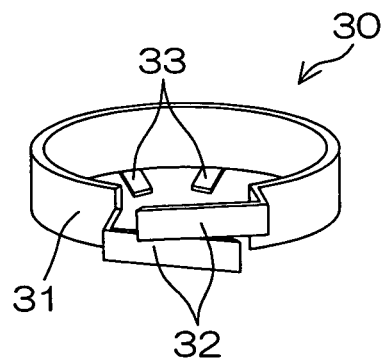
FIG. 4 is a perspective view of a biasing member for biasing an end of a worm shaft.

Referring to FIG. 3 (a sectional view taken along a line III-III in FIG. 2) and FIG. 4, the biasing member 30 includes a generally annular main body 31 having ends, a radial biasing portion 32 including a pair of resilient tongues respectively provided at the ends of the main body 31 as inclined in a staggered manner, and an axial biasing portion 33 including a plurality of inclined resilient tongues provided on a side edge of the main body 31.

Referring to FIGS. 2 and 3, the radial biasing portion 32 is received by a reception recess 34 formed in an inner peripheral surface of the bearing retention hole 29, and the second end portion 18b of the worm shaft 18 is biased radially toward the worm wheel 19 via the second bearing 23 by a biasing force of the radial biasing portion 32. Thus, backrush between the worm shaft 18 and the worm wheel 19 is eliminated.

Referring to FIG. 2, the axial biasing portion 33 is disposed between an end wall 17b of the housing 17a and an end face of the outer ring 27 of the second bearing 23 opposed to the end wall 17b, and supported by the end wall 17b to resiliently bias the worm shaft 18 axially toward the electric motor 16 via the second bearing 23.

On the other hand, the outer ring 26 of the first bearing 22 is axially positioned by a screw member 36 which is screwed into a screw hole 35 connected to the corresponding bearing retention hole 28 for preload adjustment and back rush adjustment. Thus, a biasing force of the axial biasing portion 33 simultaneously applies a preload to the first and second bearings 22, 23, and eliminates the backrush between the worm shaft 18 and the worm wheel 19.

Figure 5:
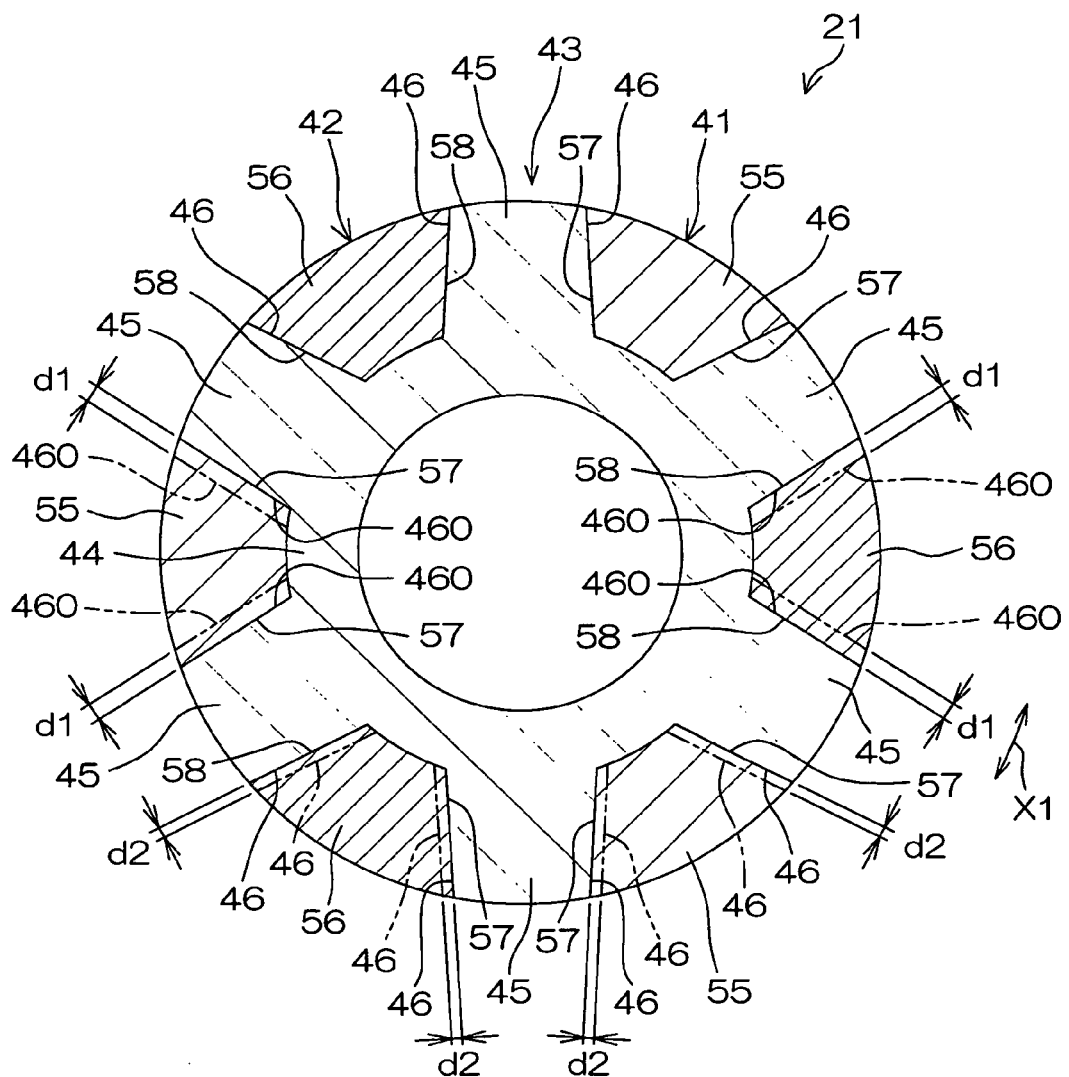
FIG. 5 is a sectional view taken along a line V-V in FIG. 2.

Referring to FIG. 2, FIG. 5 (a sectional view taken along a line V-V in FIG. 2) and FIG. 6 (an exploded perspective view), the power transmission joint 21 will be described in detail. Referring first to FIG. 2, the power transmission joint 21 includes a first engagement member 41 co-rotatably connected to the outer shaft 20 of the electric motor 16, a second engagement member 42 co-rotatably connected to the first end portion 18a of the worm shaft 18 as the input shaft of the speed reduction mechanism 17, and an elastic member 43 disposed between the first and second engagement members 41 and 42 for transmitting a torque between the engagement members 41 and 42. The first and second engagement members 41, 42 are composed of, for example, a metal. The elastic member 43 is composed of, for example, a synthetic rubber or a synthetic resin such as polyurethane.

Figure 6:
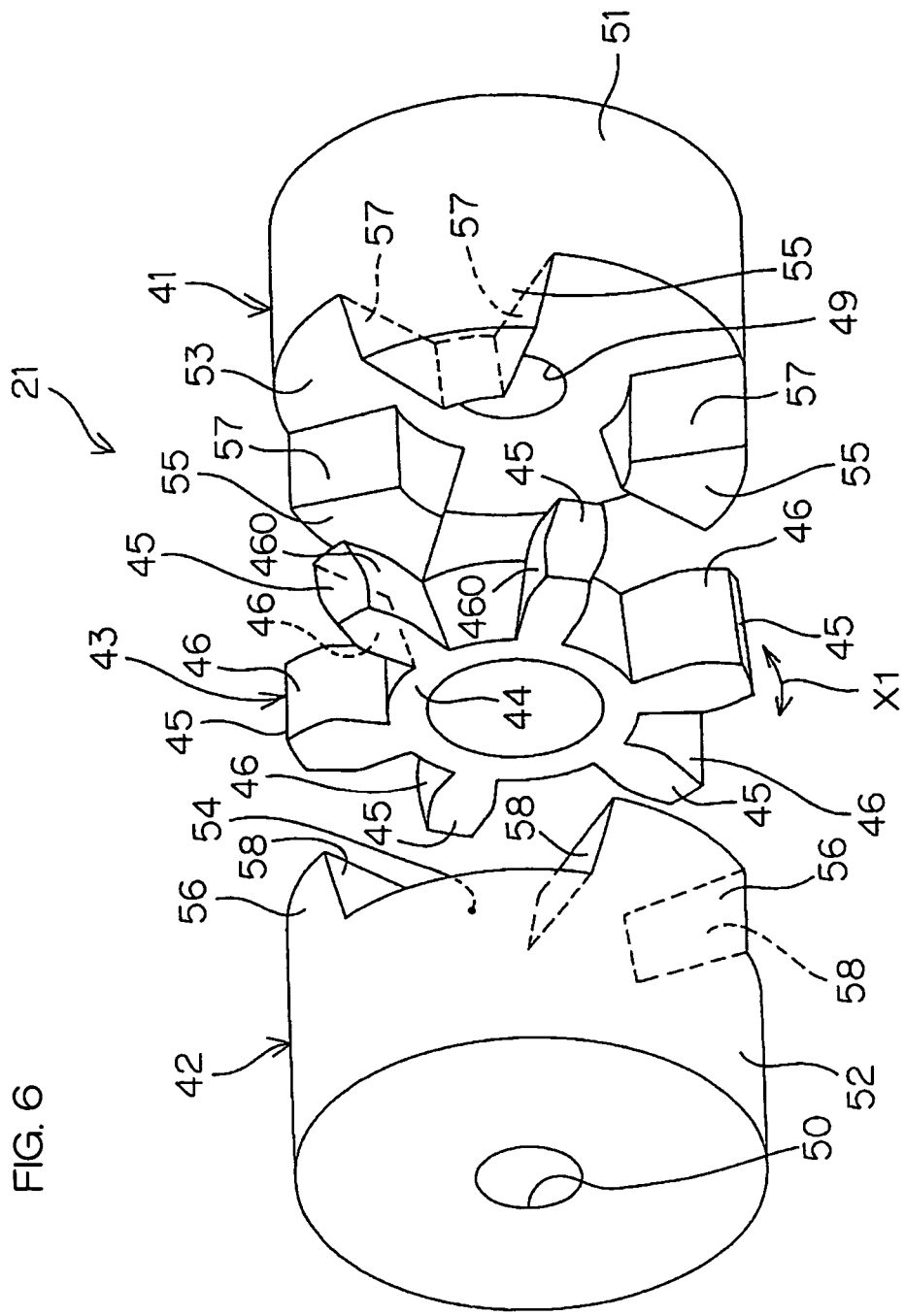
FIG. 6 is an exploded perspective view of a power transmission joint.
Figure 7A:
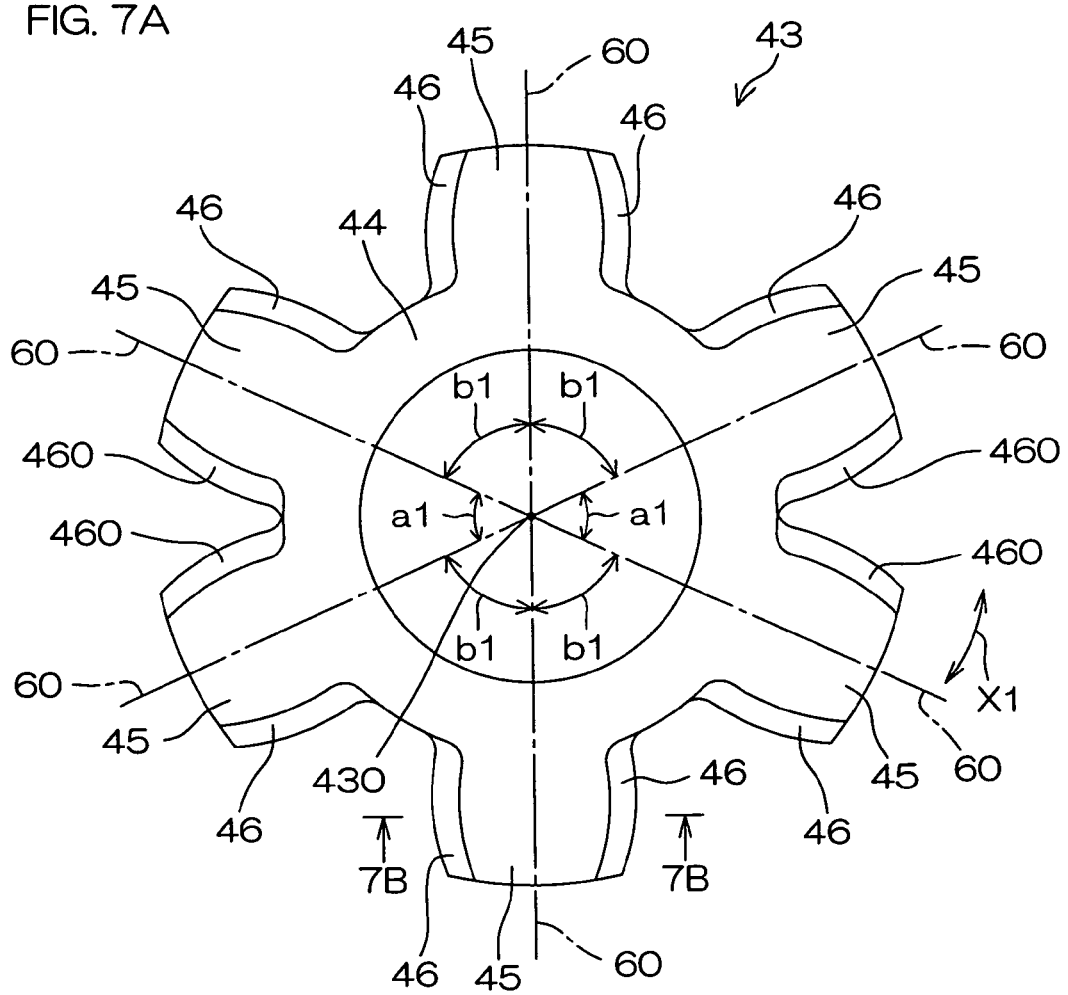
FIG. 7A is a front view of an elastic member in a non-restricted state.

Referring to FIGS. 5 and 6, the elastic member 43 includes an annular main body 44, and a plurality of engagement arms 45 extending radially from the main body 44. As shown in FIG. 7A which illustrates the elastic member 43 in a free state not restricted by the first and second engagement members 41, 42, intervals of the engagement arms 45 defined between thicknesswise center lines 60 of the engagement arms 45 around the main body 44 (expressed by center angles a1, b1 about a center axis 430 of the elastic member 43) include relatively small intervals (corresponding to the center angles a1) and relatively great intervals (corresponding to the center angles b1).

Figure 7B:
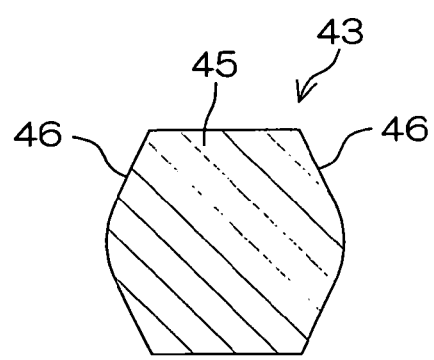
FIG. 7B is a sectional view taken along a line 7B-7B in FIG. 7A.

The plurality of engagement arms 45 include engagement arms 45 each having a pair of power transmission faces 46, 46 facing opposite from each other circumferentially (X1) of the main body 44, and engagement arms 45 each having a pair of power transmission faces 46, 460 facing circumferentially (X1) opposite from each other. As shown in FIG. 6 and FIG. 7B (a sectional view taken along a line 7B-7B in FIG. 7A), axially middle portions of the power transmission faces 46, 460 are each bulged into a chevron shape. As shown in FIGS. 5 and 7A, the opposed power transmission faces 460 of each pair of engagement arms 45 defining the center angle a1 therebetween each have an increased interference as will be described later. That is, these power transmission faces 460 are relatively great interference power transmission faces each having a relatively great interference d1. The other power transmission faces 46 are relatively small interference power transmission faces each having a relatively small interference d2.

Referring to FIG. 7A, radially middle portions of the power transmission faces 46, 460 of the engagement arms 45 are each also bulged into a chevron shape. (The term "radially" means a direction in which the engagement arms 45 extend from the main body 44.) Here, power transmission faces 46, 460 of the engagement arms 45 are disposed radially symmetrically with respect to a center of the annular main body 44. The center itself is shown by example as the intersection of center lines 60.

Referring to FIG. 6, the first engagement member 41 includes an annular main body 51 having an engagement hole 49 for engagement with the output shaft 20, and a plurality of first engagement projections 55 projecting from a surface 53 of the main body 51 opposed to the second engagement member 42, while the second engagement member 42 include an annular main body 52 having an engagement hole 50 for engagement with the worm shaft 18, and a plurality of second engagement projections 56 projecting from a surface 54 of the main body 52 opposed to the first engagement member 41.

The first engagement projections 55 of the first engagement member 41 have the same shape and size, and are equidistantly arranged circumferentially of the main body 51. The second engagement projections 56 of the second engagement member 42 have the same shape and size, and are equidistantly arranged circumferentially of the main body 52.

In the power transmission joint 21 in an assembled state as shown in FIG. 5, the first and second engagement projections 55, 56 of the first and second engagement members 41, 42 are arranged in circumferentially alternate relation, and the corresponding engagement arms 45 of the elastic member 43 are held between the circumferentially adjacent first and second engagement projections 55 and 56. In other words, the first and second engagement projections 55, 56 are meshed with the engagement arms 45 by holding the corresponding engagement arms 45 of the elastic member 43 between the circumferentially adjacent first and second engagement projections 55 and 56.

As shown in FIGS. 5 and 6, the first and second engagement projections 55 and 56 respectively have power transmission faces 57 and 58 each associated with the power transmission face 46 or 460 of the corresponding engagement arm 45 of the elastic member 43.

According to this embodiment, when the engagement arms 45 of the elastic member 43 and the first and second engagement projections 55, 56 of the first and second engagement members 41, 42 are combined together in an alternating fashion as shown in FIG. 5, the power transmission faces 460 of the engagement arms defining the relatively small center angle a1 therebetween each have the relatively great interference d1, and the other power transmission faces 46 each have the relatively small interference d2.

Since the interferences of the power transmission faces 46 are not so great, it is easy to combine the elastic member 43 with the first and second engagement members 41, 42.

Further, the elastic member 43 easily accommodates centering offset and angular offset between the first and second engagement members 41 and 42. i.e., between the output shaft 20 and the worm shaft 18, and suppresses an increase in loss torque occurring due to the frictional resistance during the rotation, thereby improving the steering feeling.

In addition, even if the engagement arms 45 of the elastic member 43 are flattened during prolonged use, the power transmission faces 460 of the engagement arms 45 each originally having the relatively great interference d1 still have sufficient interferences. Therefore, the torque transmission is mainly achieved through the power transmission faces 460 of the engagement arms 45. As a result, noise and torque transmission variation can be suppressed for a long period of time.

A gap of about 10 μm, for example, may be provided between the positioning step 17c of the housing 17a and the outer ring 26 of the first bearing 22, and the worm shaft 18 may be biased axially by the biasing force of the elastic member 43. In this case, the elastic member 43 also contributes to the backrush adjustment.

In this embodiment, the intervals of the engagement arms 45 defined between the thicknesswise center lines 60 of the engagement arms 45 may differ from each other, so that the engagement arms 45 are arranged at different pitches.

Figure 8:
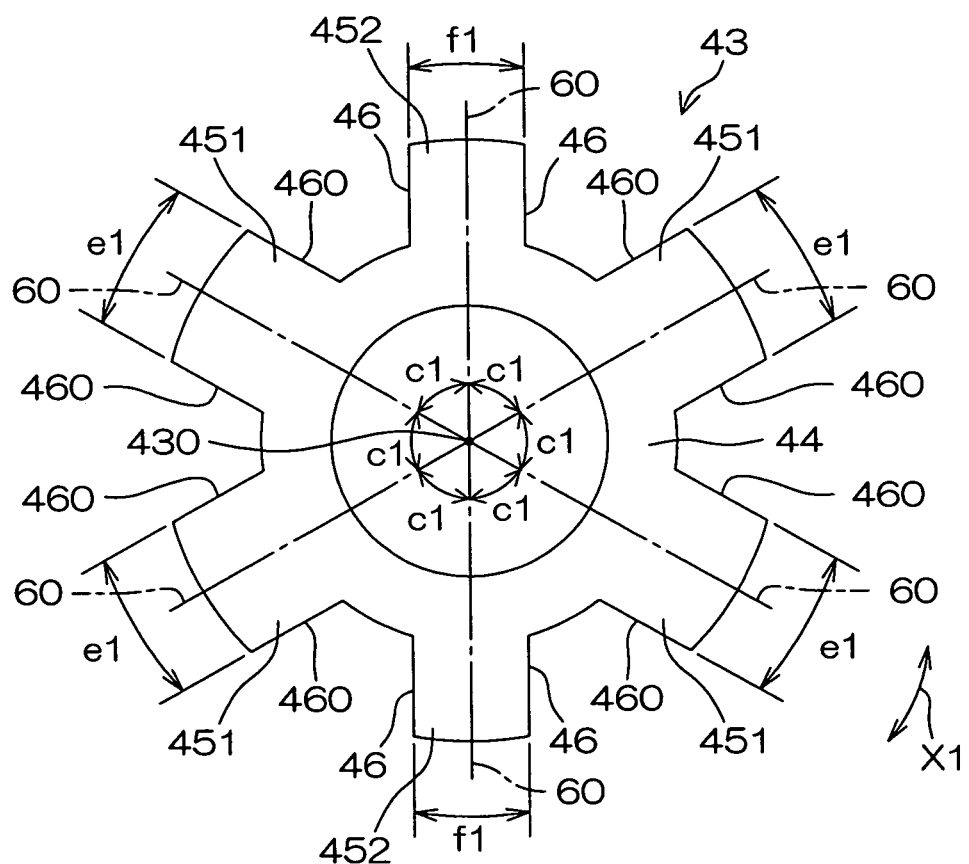
FIG. 8 is a front view of an elastic member according to another embodiment of the invention.

In the present invention, it is merely necessary to provide the power transmission faces 460 each having the relatively great interference d1. Therefore, as shown in FIG. 8, the elastic member 43 in a free state not restricted by the first and second engagement members 41, 42 may be configured such that the engagement arms 45 are arranged at the same interval defined between the thicknesswise center lines 60 thereof (corresponding to a center angle c1) and include engagement arms 451 each having a relatively great thickness e1 as measured in the circumferential direction X1 and engagement arms 452 each having a relatively small thickness f1. That is, e1>f1. In this case, the engagement arms 451 each having the relatively great thickness e1 each have a pair of power transmission faces 460 each having a relatively great interference.

In the embodiment of FIG. 8, the engagement arms 451, 452 are equidistantly arranged, but may be arranged at different intervals as in the embodiment of FIG. 7A.

Figure 9:
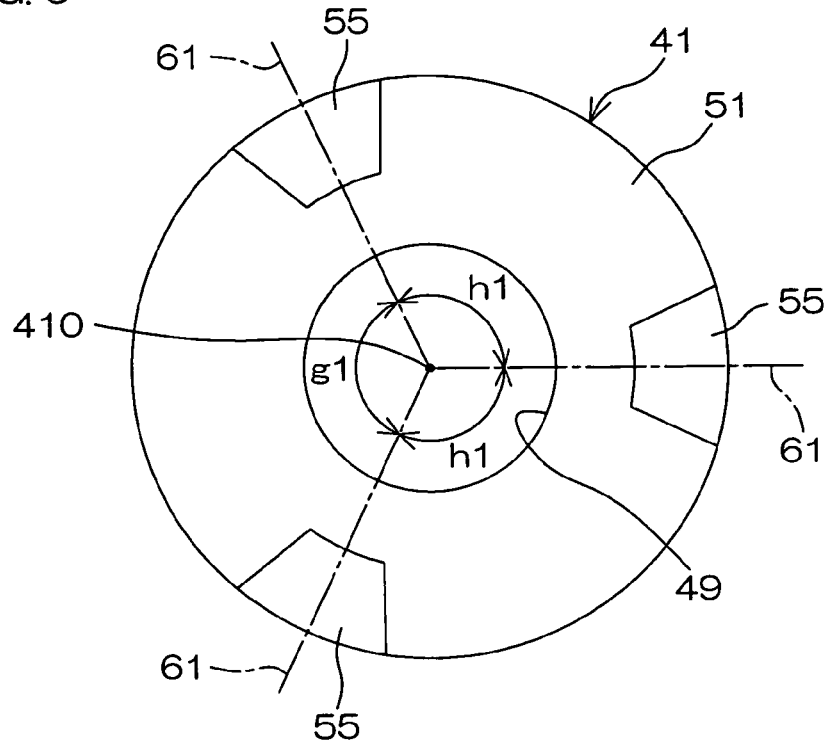
FIG. 9 is a front view of a first engagement member according to further another embodiment of the invention.

As shown in FIG. 9, the first engagement member 41 may be configured such that intervals of the first engagement projections 55 defined between thicknesswise center lines 61 of the first engagement projections 55 (expressed by center angles g1, h1 about a center axis 410 of the first engagement member 41) include a relatively great interval (corresponding to the relatively great center angle g1) and relatively small intervals (corresponding to the relatively small center angles h1) (i.e., g1>h1). Alternatively, as shown in FIG. 10, the first engagement member 41 may be configured such that the first engagement projections are arranged at the same interval defined between the thicknesswise center lines 61 thereof (corresponding to a center angle j1) and include a first engagement projection 551 having a relatively great thickness m1 as measured circumferentially of the first engagement member 41 and first engagement projections 552 each having a relatively small thickness n1.

Figure 10:
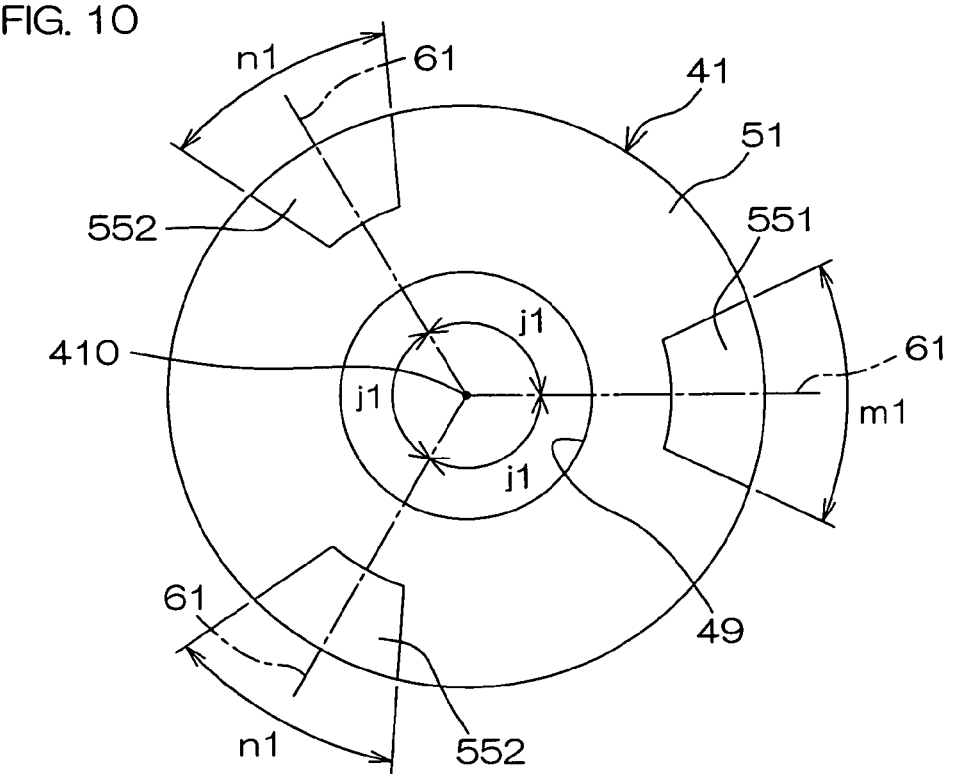
FIG. 10 is a front view of a first engagement member according to still another embodiment of the invention.

In the embodiments of FIGS. 9 and 10, the engagement arms 45 preferably have the same thickness, and are equidistantly arranged. Further, the engagement projections 56 of the second engagement member 42 preferably have the same thickness, and are equidistantly arranged.

Figure 11:
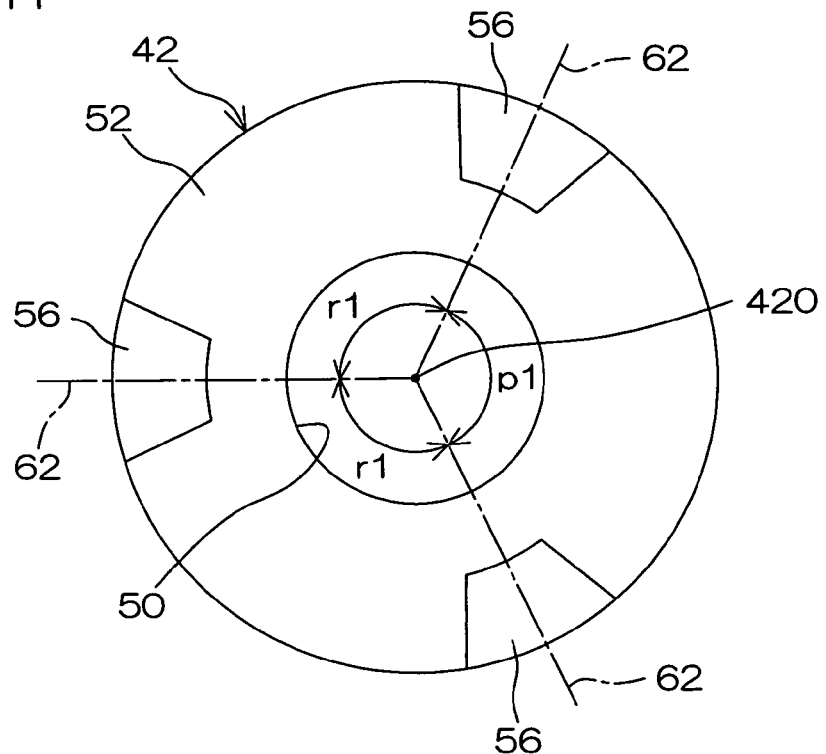
FIG. 11 is a front view of a second engagement member according to further another embodiment of the invention.

As shown in FIG. 11, the second engagement member 42 may be configured such that intervals of the second engagement projections 56 defined between thicknesswise center lines 62 of the second engagement projections 56 (expressed by center angles p1, r1 about a center axis 420 of the second engagement member 42) include a relatively great interval (corresponding to the relatively great center angle g1) and relatively small intervals (corresponding to the relatively small center angles r1) (i.e., p1>r1). Alternatively, as shown in FIG. 12, the second engagement member 42 may be configured such that the second engagement projections 56 are arranged at the same interval (corresponding to a center angle w1) and include a second engagement projection 561 having a relatively great thickness y1 as measured circumferentially of the second engagement member 42 and second engagement projections 562 each having a relatively small thickness z1 (i.e., y1>z1).

Figure 12:
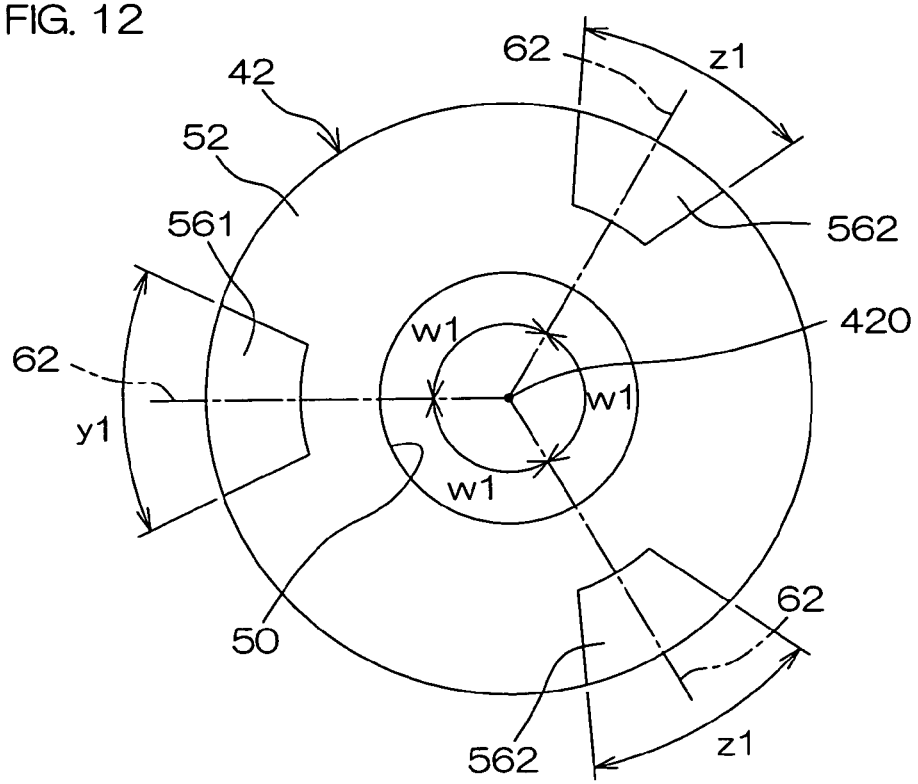
FIG. 12 is a front view of a second engagement member according to still another embodiment of the invention.

In the embodiments of FIGS. 11 and 12, the engagement arms 45 preferably have the same thickness, and are equidistantly arranged. Further, the engagement projections 55 of the first engagement member 41 preferably have the same thickness, and are equidistantly arranged.

In FIG. 9, the intervals of the first engagement projections 55 may differ from each other, so that the first engagement projections 55 are arranged at different pitches. In FIG. 11, the intervals of the second engagement projections 56 may differ from each other, so that the second engagement projections 56 are arranged at different pitches.

Figure 13:
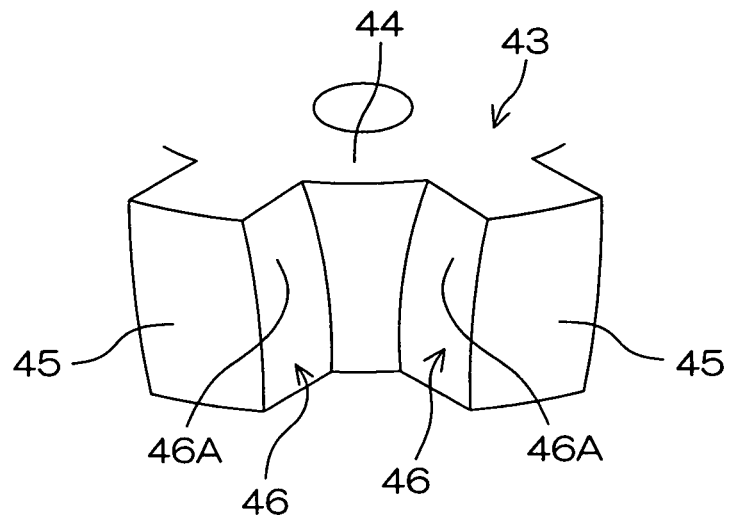
FIG. 13 is a perspective view of major portions of an elastic member according to further another embodiment of the invention.

The present invention is not limited to the embodiments described above. For example, at least one power transmission face 46 of at least one engagement arm 45 may include a cam surface 46A, as shown in FIG. 13, which can be circumferentially compressed as the first and second engagement members 41, 42 axially approach each other.

Figure 14A:
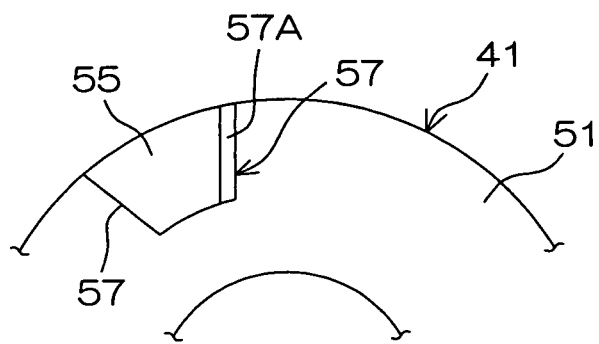
FIG. 14A is a front view of major portions of a first engagement member according to still another embodiment of the invention.
Figure 14B:
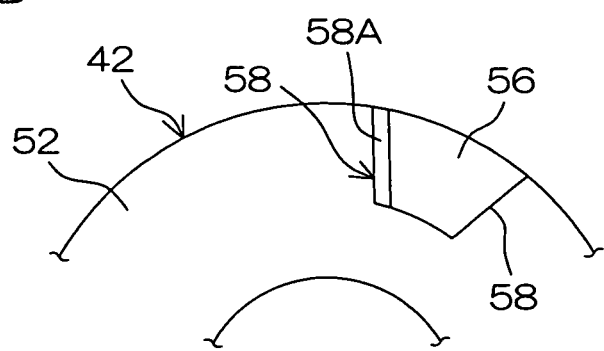
FIG. 14B is a front view of major portions of a second engagement member according to further another embodiment of the invention.

Further, as shown in FIG. 14A or 14B, at least one of the power transmission faces 57, 58 of the first and second engagement projections 55, 56 may include a cam surface 57A, 58A which can circumferentially compress the engagement arm 45 of the elastic member 43 as the first and second engagement members 41, 42 axially approach each other. The embodiments of FIGS. 13, 14A and 14B are advantageous in that the elastic member 43 can assuredly be brought into circumferential press contact with the engagement projections 55, 56 when the elastic member 43 is axially compressed by the first and second engagement members 41, 42.

In the embodiments described above, the worm gear mechanism is used as the speed reduction mechanism, but any of other known gear mechanisms such as a bevel gear mechanism may be used. A rotation shaft of a driving gear of the bevel gear mechanism or the like gear mechanism may be used as the input shaft of the speed reduction mechanism.

While the present invention has been described in detail by way of the specific embodiments, skilled persons who have understood the foregoing will easily come up with variations, modifications and equivalents of the embodiments. Therefore, the scope of the present invention is defined by the appended claims and their equivalents.

This application corresponds to Japanese Patent Application No. 2004-22118 filed with the Japanese Patent Office on Jan. 29, 2004, the disclosure of which is incorporated herein by reference.

NAMES OF PARTIES TO A JOINT RESEARCH AGREEMENT

KOYO SEIKO CO., LTD., TOYODA KOKI KABUSHIKI KAISHA and FAVESS CO., LTD. were parties to a joint research agreement.

What is claimed is:
1. An electric power steering device comprising:
a steering assist electric motor having an output shaft;
a speed reduction mechanism including an input shaft disposed coaxially with the output shaft of the electric motor; and
a power transmission joint which couples the output shaft of the electric motor to the input shaft of the speed reduction mechanism for power transmission, the power transmission joint including an annular first engagement member co-rotatably connected to the output shaft of the electric motor, an annular second engagement member co-rotatably connected to the input shaft of the speed reduction mechanism, and an elastic member disposed between the first and second engagement members for transmitting a torque between the first and second engagement members, wherein:
the elastic member includes an annular main body, and a plurality of engagement arms provided at predetermined intervals circumferentially along the main body and extending radially from the main body,
the first and second engagement members each includes a plurality of engagement projections engaged with respective ones of the engagement arms of the elastic member circumferentially along the main body,
each of the engagement arms of the elastic member includes a pair of power transmission faces, which are engaged with power transmission faces of corresponding engagement projections of the first and second engagement members with interference fits,
the power transmission faces of the engagement arms include first power transmission faces each having a first interference fit and second power transmission faces each having a second interference fit, the first interference fit being larger than the second interference fit and each of the first power transmission faces being bulged into a first chevron shape, and each of the second power transmission faces being bulged into a second chevron shape different from the first chevron shape, each of the first and second engagement members including a respective engagement projection that engages a respective first power transmission face of an engagement atm, and another respective engagement projection that engages a respective second power transmission face of an engagement arm, and the first power transmission faces are disposed radially symmetrically with respect to a center of the annular main body of the elastic member.

2. An electric power steering device as set forth in claim 1, wherein the engagement arms in a free state not restricted by the first and second engagement members are arranged at intervals which include a relatively great interval and a relatively small interval relative to the relatively great interval, wherein the relatively great and small intervals are measured circumferentially along the main body.

3. An electric power steering device as set forth in claim 2, wherein the engagement arms in the free state not restricted by the first and second engagement members include an engagement arm having a relatively great thickness and an engagement arm having a relatively small thickness relative to the engagement arm having the relatively great thickness, wherein the relatively great and small thicknesses are measured circumferentially along the main body.

4. An electric power steering device as set forth in claim 1, wherein the engagement arms in a free state not restricted by the first and second engagement members include an engagement arm having a relatively great thickness and an engagement arm having a relatively small thickness relative to the engagement arm having the relatively great thickness, wherein the relatively great and small thicknesses are measured circumferentially along the main body.

5. An electric power steering device as set forth in claim 1, wherein at least one of the first and second engagement members is a varying-interval engagement member, the varying-interval engagement member having engagement projections arranged at intervals which include a relatively great interval and a relatively small interval relative to the relatively great interval, wherein the great and small intervals are measured circumferentially along the varying-interval engagement member.

6. An electric power steering device as set forth in claim 5, wherein at least one of the first and second engagement members is a varying-projection-thickness engagement member, the varying-projection-thickness engagement member including an engagement projection having a relatively great thickness and an engagement projection having a relatively small thickness relative to the engagement projection having the relatively great thickness, wherein the relatively great and small thicknesses are measured circumferentially along the varying-projection-thickness engagement member.

7. An electric power steering device as set forth in claim 1, wherein at least one of the first and second engagement members is a varying-projection-thickness engagement member, the varying-projection-thickness engagement member including an engagement projection having a relatively great thickness and an engagement projection having a relatively small thickness relative to the engagement projection having the relatively great thickness, wherein the relatively great and small thicknesses are measured circumferentially along the varying-projection-thickness engagement member.

8. An electric power steering device as set forth in claim 1, wherein at least one of the power transmission faces of the engagement arms includes a cam surface which increases circumferential compression of the elastic member as the first and second engagement members axially approach each other.

9. An electric power steering device as set forth in claim 1, wherein at least one of the engagement projections of at least one of the first and second engagement members has a cam surface which increases circumferential compression of the elastic member as the first and second engagement members axially approach each other.

10. An electric power steering device as set forth in claim 1, wherein the power transmission faces each having the first interference fit and the power transmission faces each having the second interference fit are alternatingly arranged with each other around the center of the elastic member.

11. An electric power steering device as set forth in claim 1, wherein the pair of power transmission faces of at least one of the engagement arms includes the first power transmission face and the second power transmission face, and the pair of power transmission faces of at least another one of the engagement arms includes a pair of the second power transmission faces.

12. An electric power steering device as set forth in claim 11, wherein a first engagement arm is adjacent a second engagement arm, and the pair of power transmission faces of each the first and second engagement arms includes the first transmission face and the second power transmission face, and a first angle is formed between respective center lines of the first and second engagement arms, and a third engagement arm is adjacent the second engagement arm and includes power transmission faces including the pair of the second power transmission faces, a second angle being formed between a center line of the third engagement arm and the center line of the second engagement arm, the second angle being larger than the first angle.

13. An electric power steering device, comprising:
an electric motor having an output shaft;
a speed reduction mechanism including an input shaft disposed coaxially with the electric motor output shaft; and
a power transmission joint including
an annular first engagement member including a first plurality of engagement projections, co-rotatably connected to the electric motor output shaft,
an annular second engagement member including a second plurality of engagement projections, co-rotatably connected to the speed reduction mechanism input shaft, and
an elastic member having a plurality of engagement arms extending radially from a circumferential surface of the elastic member and engaged with the first and second engagement members,
the engagement arms having power transmission faces respectively connected to the first engagement member and the second engagement member to transmit a torque between the first and second engagement members, the power transmission faces each engaging with a face of one of the engagement projections with an interference fit, the power transmission faces including first power transmission faces each having a first interference fit and second power transmission faces each having a second interference fit, wherein each of the first power transmission faces is bulged into a first chevron shape that extends radially from the circumferential surface, and each of the second power transmission faces is bulged into a second chevron shape, that extends radially from the circumferential surface, different from the first chevron shape,
the first power transmission faces being disposed radially symmetrically with respect to a center of the elastic member,
wherein each of the plurality of the engagement arms forms another chevron shape that extends axially and from the first engagement member to the second engagement member.

14. An electric power steering apparatus according to claim 13, wherein the engagement arms form an interference fit with the first and second engagement members.

15. A power transmission joint for an electric power steering device that includes an electric motor and a speed reduction mechanism, the power transmission joint coupling an output shaft of the electric motor to an input shaft of the speed reduction mechanism, the power transmission joint comprising:
 an annular first engagement member including a first plurality of engagement projections, co-rotatably connected to the electric motor output shaft;
 an annular second engagement member including a second plurality of engagement projections, co-rotatably connected to the speed reduction mechanism input shaft; and
 an elastic member having a plurality of engagement arms extending radially from a circumferential surface of the elastic member and engaged with the first and second engagement members,
 the engagement arms having power transmission faces respectively connected to the first engagement member and the second engagement member to transmit a torque between the first and second engagement members, the power transmission faces each engaging with a face of one of the engagement projections with an interference fit, the power transmission faces including first power transmission faces each having a first interference fit and second power transmission faces each having a second interference fit, wherein each of the first power transmission faces is bulged into a first chevron shape that extends radially from the circumferential surface, and each of the second power transmission faces is bulged into a second chevron shape, that extends radially from the circumferential surface, different from the first chevron shape,
 the first power transmission faces being disposed radially symmetrically with respect to a center of the elastic member,
 wherein each of the plurality of the engagement arms forms another chevron shape that extends axially and from the first engagement member to the second engagement member.

16. A power transmission joint as set forth in claim 15, wherein the engagement arms form an interference fit with the first and second engagement members.

17. An electric power steering device comprising:
 a steering assist electric motor having an output shaft;
 a speed reduction mechanism including an input shaft disposed coaxially with the output shaft of the electric motor; and
 a power transmission joint which couples the output shaft of the electric motor to the input shaft of the speed reduction mechanism for power transmission, the power transmission joint including an annular first engagement member co-rotatably connected to the output shaft of the electric motor, an annular second engagement member co-rotatably connected to the input shaft of the speed reduction mechanism, and an elastic member disposed between the first and second engagement members for transmitting a torque between the first and second engagement members, wherein:
 the elastic member includes an annular main body, and a plurality of engagement arms provided at predetermined intervals circumferentially along the main body and extending radially from the main body,
 the first and second engagement members each includes a plurality of engagement projections engaged with respective ones of the engagement arms of the elastic member circumferentially along the main body,
 each of the engagement arms of the elastic member includes a pair of power transmission faces which are engaged with power transmission faces of corresponding engagement projections of the first and second engagement members with interference fits,
 the power transmission faces of the engagement arms include first power transmission faces each having a first interference fit and second power transmission faces each having a second interference fit, the first interference fit being larger than the second interference fit and each of the first and second engagement members includes a respective engagement projection engagement projections that engages a respective first power transmission face of an engagement arm, and another respective engagement projection that engages a respective second power transmission face of an engagement arm, and
 the first power transmission faces are disposed radially symmetrically with respect to a center of the annular main body of the elastic member,
 wherein the pair of power transmission faces of each of a plurality of the engagement arms includes the first power transmission face and the second power transmission face, and the pair of power transmission faces of each of a plurality of the engagement arms includes a pair of the second power transmission faces, and
 wherein adjacent engagement arms that each include the first power transmission face and the second power transmission face are spaced closer together than adjacent engagement arms that each include the pair of the second power transmission faces.

18. An electric power steering device as set forth in claim 17, wherein each of the first power transmission faces is adjacent and faces another first power transmission face, further wherein each of the second power transmission faces is adjacent and faces another second power transmission face, the adjacent first power transmission faces being closer together than the adjacent second power transmission faces.

19. An electric power steering device, comprising:
 an electric motor having an output shaft;
 a speed reduction mechanism including an input shaft disposed coaxially with the electric motor output shaft; and
 a power transmission joint including
 an annular first engagement member including a first plurality of engagement projections, co-rotatably connected to the electric motor output shaft,
 an annular second engagement member including a second plurality of engagement projections, co-rotatably connected to the speed reduction mechanism input shaft, and
 an elastic member having a plurality of engagement arms extending radially from a circumferential surface of the elastic member,
 the engagement arms having power transmission faces respectively connected to the first engagement member and the second engagement member to transmit a torque between the first and second engagement members, the power transmission faces each engaging with a face of one of the engagement projections with an interference fit, the power transmission faces including a plurality of first power transmission faces having a first interference fit and a plurality of second power transmission faces having a second interference fit, the first interference fit being larger than the second interference fit and each of the first and second engagement members includes a respective engagement projection of the engagement projections that engages a respective first power transmission face of an engagement arm of the engagement arms, and another respective engagement projection of the engagement projections that engages a respective second power transmission face of an engagement arm of the engagement arms, and the first power transmission faces are disposed radially symmetrically with respect to a center of the elastic member, wherein a pair of power transmission faces of each of a plurality of the engagement arms includes the first power transmission face and the second power transmission face, and a pair of power transmission faces of each of a plurality of the engagement arms includes a pair of the second power transmission faces, and wherein adjacent ones of the engagement arms that each include the first power transmission face and the second power transmission face are spaced closer together than adjacent ones of the engagement arms that each include the pair of the second power transmission faces, wherein each of the plurality of the engagement arms forms a chevron shape that extends axially and from the first engagement member to the second engagement member.

20. A power transmission joint for an electric power steering device that includes an electric motor and a speed reduction mechanism, the power transmission joint coupling an output shaft of the electric motor to an input shaft of the speed reduction mechanism, the power transmission joint comprising:

an annular first engagement member including a first plurality of engagement projections, co-rotatably connected to the electric motor output shaft;

an annular second engagement member including a second plurality of engagement projections, co-rotatably connected to the speed reduction mechanism input shaft; and an elastic member having a plurality of engagement arms extending radially from a circumferential surface of the elastic member, the engagement arms having power transmission faces respectively connected to the first engagement member and the second engagement member to transmit a torque between the first and second engagement members, the power transmission faces each engaging with a face of one of the engagement projections with an interference fit, the power transmission faces including first power transmission faces each having a first interference fit and second power transmission faces each having a second interference fit, the first interference fit being larger than the second interference fit and each of the first and second engagement members includes a respective engagement projection of the engagement projections that engages a respective first power transmission face of one of the engagement arms, and another respective engagement projection of the engagement projections that engages a respective second power transmission face of one of the engagement arms, and the first power transmission faces are disposed radially symmetrically with respect to a center of the elastic member, wherein a pair of power transmission faces of each of a plurality of the engagement arms includes the first power transmission face and the second power transmission face, and a pair of power transmission faces of each of a plurality of the engagement arms includes a pair of the second power transmission faces, and wherein adjacent ones of the engagement arms that each include the first power transmission face and the second power transmission face are spaced closer together than adjacent ones of the engagement arms that each include the pair of the second power transmission faces, wherein each of the plurality of the engagement arms forms a chevron shape that extends axially and from the first engagement member to the second engagement member.

* * * * *

UNITED STATES PATENT AND TRADEMARK OFFICE
CERTIFICATE OF CORRECTION

PATENT NO. : 8,602,154 B2
APPLICATION NO. : 10/587316
DATED : December 10, 2013
INVENTOR(S) : Souichi Iwasa and Toshio Iida Page 1 of 1

It is certified that error appears in the above-identified patent and that said Letters Patent is hereby corrected as shown below:

IN THE CLAIMS

In claim 1:

Column 8, line 64 after "engagement", change "atm" to --arm--.

Signed and Sealed this
Twenty-fifth Day of February, 2014

Michelle K. Lee
*Deputy Director of the United States Patent and Trademark Office*